(12) United States Patent
Lang et al.

(10) Patent No.: US 8,393,442 B2
(45) Date of Patent: Mar. 12, 2013

(54) HIGH GAIN ASYMMETRY BRAKE

(75) Inventors: David J. Lang, Rockford, IL (US);
James M. Regan, Rockford, IL (US)

(73) Assignee: Hamilton Sundstrand Corporation, Rockford, IL (US)

(*) Notice: Subject to any disclaimer, the term of this patent is extended or adjusted under 35 U.S.C. 154(b) by 1196 days.

(21) Appl. No.: 12/228,595

(22) Filed: Aug. 14, 2008

(65) Prior Publication Data
US 2010/0038493 A1  Feb. 18, 2010

(51) Int. Cl.
*B60T 7/12* (2006.01)
(52) U.S. Cl. ........................................ 188/134
(58) Field of Classification Search .......... 188/180, 188/187, 166, 163, 72.7, 71.5, 134
See application file for complete search history.

(56) References Cited

U.S. PATENT DOCUMENTS

| | | | |
|---|---|---|---|
| 4,121,795 A | 10/1978 | Craven | |
| 4,633,984 A | 1/1987 | Hudson | |
| 4,898,265 A | 2/1990 | Metcalf | |
| 5,353,901 A * | 10/1994 | Jacques et al. | 192/223.3 |
| 5,484,043 A | 1/1996 | Quick et al. | |
| 5,743,490 A | 4/1998 | Gillingham et al. | |
| 6,196,361 B1 | 3/2001 | Russ et al. | |
| 6,419,606 B1 | 7/2002 | Tengan et al. | |
| 6,659,398 B2 | 12/2003 | Serven | |
| 6,752,248 B2 | 6/2004 | Berwanger | |
| 6,824,099 B1 | 11/2004 | Jones | |
| 2004/0200677 A1* | 10/2004 | Mayer et al. | 188/134 |
| 2007/0227838 A1 | 10/2007 | Shigeta et al. | |

OTHER PUBLICATIONS

PowerPoint slide entitled "Trailing Edge", Boeing NAPD Presentation, Presented Dec. 9, 2000, Dowty Boulton Paul Ltd., United Kingdom.

* cited by examiner

*Primary Examiner* — Melanie Torres Williams
(74) *Attorney, Agent, or Firm* — Kinney & Lange, P.A.

(57) ABSTRACT

An asymmetry brake includes a housing, a shaft, a pilot brake, a primary brake, and a ball ramp assembly. The shaft of the asymmetry brake is rotatable relative to the housing about an axis of rotation. The primary brake is movably connected with the shaft. The pilot brake is configured to selectively engage the housing to generate a triggering torque. The triggering torque is transferred through the ball ramp assembly to the primary brake, which in response engages the housing to generate a braking torque on the shaft. The disposition of the ball ramp assembly between the pilot brake and the primary brake allows the ball ramp assembly to return to an operative non-separated condition when the pilot brake is disengaged from the housing. The return of the ball ramp assembly to the operative non-separated condition allows the primary brake to disengage from the housing which releases the shaft to rotate.

15 Claims, 5 Drawing Sheets

HIGH GAIN ASYMMETRY BRAKE

BACKGROUND

This invention relates to aircraft systems and more particularly to an asymmetry brake for use in aircraft flight control actuation systems.

Aircraft commonly include movable flight control surfaces on their wings. These surfaces are known as flaps or slats, and can be selectively extended or retracted to modify the lift-producing characteristics of the wings. Extension and retraction of the flaps or slats is accomplished by a flight control actuation system mounted in each of the wings.

A typical flight control actuation system includes a series of actuators spaced along the span of each wing. The actuators are operably connected to move one or more flaps or slats. The actuators are connected to each other by drive shafts, to form a chain of actuators and shafts extending along the span of the wing. A power drive unit (PDU) connected to the inboard end of the chain provides motive power for driving the actuators to selectively extend or retract the flaps or slats.

Because the control surfaces such as the flaps or slats significantly alter the lift-producing characteristics of the wings, it is critical for safe operation of the aircraft that the actuation system also include safety features for detecting and reacting to problems such as jamming, shaft disconnect, or failure of one of the actuators in the aircraft flight control actuation system. Of particular concern are problems that cause the position of the flaps or slats on one wing to lose synchronization with the flaps and slats on the other wing of the aircraft. Such a condition is referred to as an asymmetry. To prevent asymmetry that cannot be controlled by the PDU alone, actuation systems for flaps and slats often include a device known as an asymmetry brake which engages to hold the chain of actuators and shafts in a known position when the asymmetry develops. For example, should a shaft connecting adjacent actuators break or disconnect, the PDU would not be able to control the position of flaps or slats outboard of the broken shaft. Without means to stabilize the position of the flaps or slats, such as an asymmetry brake at the outboard end of the chain of actuators and shafts, aerodynamic loads acting upon the flaps or slats could move them in a system where the actuators can be back driven by the air loads. The uncontrolled movement of the flaps or slats would create serious flight control problems for the aircraft.

In commercial aeronautical applications, asymmetry brakes are usually checked by the pilot during system power up. This requires that the asymmetry brake be engaged and disengaged remotely by an electrical controller, usually the actuation system controller located in the PDU. Thus, typical commercial flight control actuation systems employ a fail safe (spring actuated) electrical brake which can be remotely engaged by the pilot. However, electrical brakes by themselves are usually large and heavy with little brake torque capacity. Also, the location of the asymmetry brake is usually near the end of the wing where wing envelope and space are greatly reduced. Due to the reduced available wing envelope, fail safe electrical asymmetry brakes generally do not have the capacity to react the PDU motor stall torque for either normal pre-flight test conditions or other conditions. Because of this low capacity, a separate brake is usually located in the PDU to stop the PDU in case of drive line disconnect. This separate brake and the large fail safe asymmetry brakes add weight to the aircraft, decreasing aircraft operating efficiency.

SUMMARY

An asymmetry brake includes a housing, a shaft, a pilot brake, a primary brake, and a ball ramp assembly. The shaft of the asymmetry brake is rotatable relative to the housing about an axis of rotation. The primary brake is movably connected with the shaft. The pilot brake is configured to selectively engage the housing to generate a triggering torque. The triggering torque is transferred through the ball ramp assembly to the primary brake, which in response engages the housing to generate a braking torque on the shaft.

DETAILED DESCRIPTION

Figure 1:
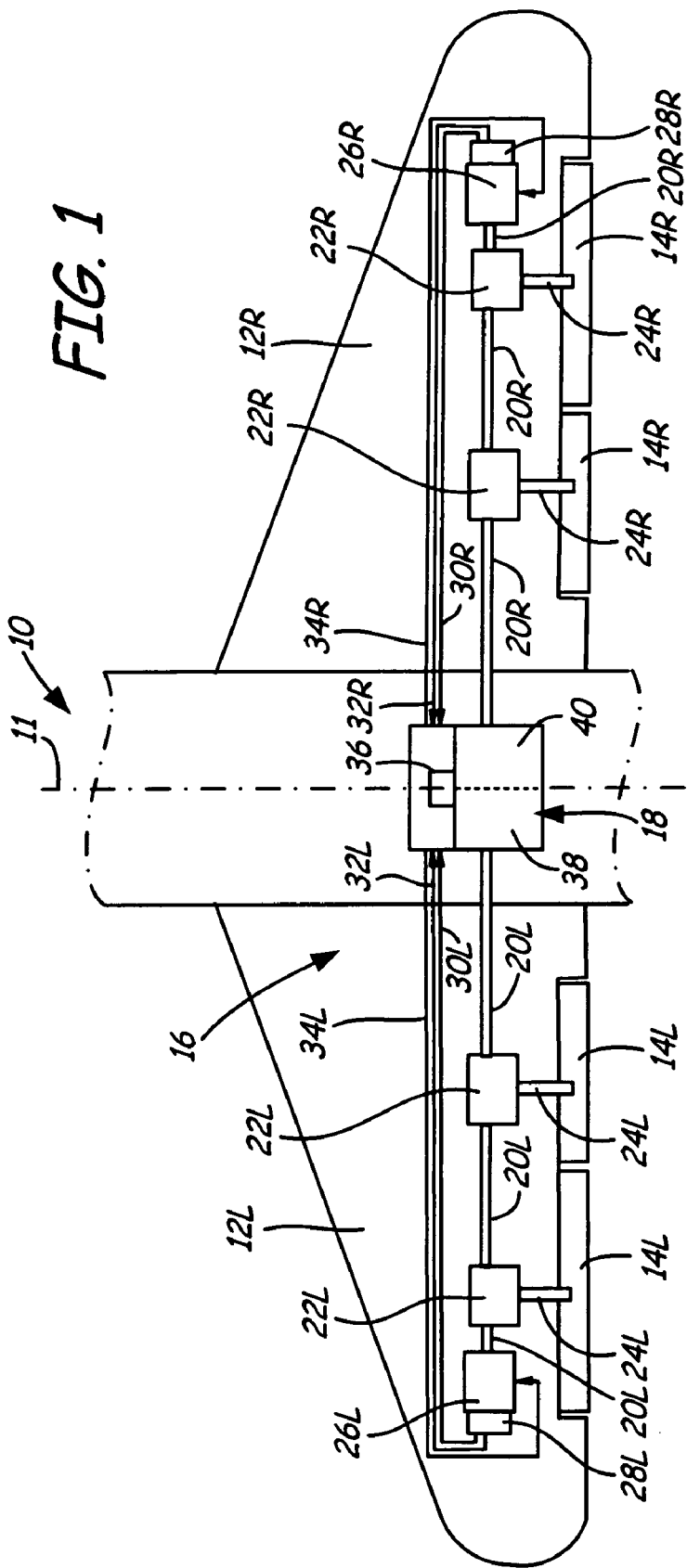
FIG. 1 is a diagram of a flight control actuation system for an aircraft.

FIG. 1 is a diagram of a flight control actuation system 16 for an aircraft 10. The aircraft 10 includes left and right wings 12L and 12R with flap panels 14L and 14R. The aircraft 10 also includes the flight control actuation system 16. The flight control actuation system 16 includes a power drive unit (PDU) 18, left and right drive line torque shafting 20L and 20R, left and right actuators 22L and 22R, left and right flap panel linkages 24L and 24R, left and right asymmetry brakes 26L and 26R, and left and right resolvers 28L and 28R. The left resolver 28L communicates with the PDU 18 over lines 30L and 32L. The PDU 18 communicates with the left asymmetry brake 26L over line 34L. Similarly, the right resolver 28R communicates with the PDU 18 over lines 30R and 32R. The PDU 18 communicates with the right asymmetry brake 26R over line 34R. The PDU 18 includes a control unit 36, a first motor 38, and a second motor 40.

In FIG. 1, the wing section of the aircraft 10 is shown broken away from the remainder of the aircraft 10. The section of the aircraft 10 illustrated is divided along a centerline 11 with the right wing 12R and a left wing 12L extending to either side of the centerline 11. The left and right wings 12L and 12R include movable flap panels 14L and 14R on their downstream portions. Portions of the flight control actuation system 16 extend through and are housed in the wings 12L and 12R. The flight control actuation system 16 operates to position the flap panels 14L and 14R relative to the remainder of the wings 12L and 12R to alter the lift-producing characteristics of the wings 12L and 12R. Although flap panels 14L and 14R are illustrated as being operable by the flight control actuation system 16 one of ordinary skill would understand that other wing structures, for example, slat panels can also be operated by the flight control actuation system 16.

The flight control actuation system 16 includes the PDU 18 which is positioned within the main body of the aircraft 10. The PDU 18 includes components which drive the left and right drive line torque shafting 20L and 20R and communicate with the actuators 22L and 22R. The actuators 22L and 22R selectively transfer the rotary motion of the drive line torque shafting 20L and 20R to the left and right flap panel linkages 24L and 24R to raise and lower the flap panels 14L and 14R in response to signals from the PDU 18. The drive line torque shafting 20L and 20R not only extends between the series of actuators 22L and 22R, but also extends to the asymmetry brakes 26L and 26R.

The asymmetry brakes 26L and 26R and resolvers 28L and 28R are disposed outward of the aircraft fuselage, proximate the ends of the wings 12L and 12R and are coupled to the drive line torque shafting 20L and 20R. The lines 30L, 30R and 32L, 32R extend from the resolvers 28L and 28R to the control unit 36 in the PDU 18. The lines 34L and 34R extend from the control unit 36 to the asymmetry brakes 26L and 26R.

The resolvers 28L and 28R include sensors such as transducers (not shown) which provide an electrical signal on lines 30L, 30R and/or 32L, 32R to the control unit 36. In another embodiment of the flight control actuation system 16, the system 16 can include position sensors such as rotary variable differential transducers (RVDT) or encoders rather than resolvers 28L and 28R. Dual lines 30L, 30R and 32L, 32R are used in the embodiment shown because the PDU 18 includes dual motors 38 and 40. The dual motor arrangement allows one motor 38 or 40 to continue to drive the drive line torque shafting 20L and 20R in the event of a failure of the other motor 38 or 40. The signal on lines 30L and 32L corresponds to the angular position of the drive line torque shafting 20L and is compared in the control unit 36 with a corresponding signal on lines 30R and 32R regarding the angular position of the drive line torque shafting 20R. In the event that the signals on the lines 30L, 30R and/or 32L, 32R indicate an unacceptable difference in the angular positions of the respective drive line torque shafting 20L and 20R, the control unit 36 provides signals on lines 34L and/or 34R to effect braking of the torque shafting 20L and 20R by the asymmetry brakes 26L and/or 26R as hereinafter described.

Figure 2:
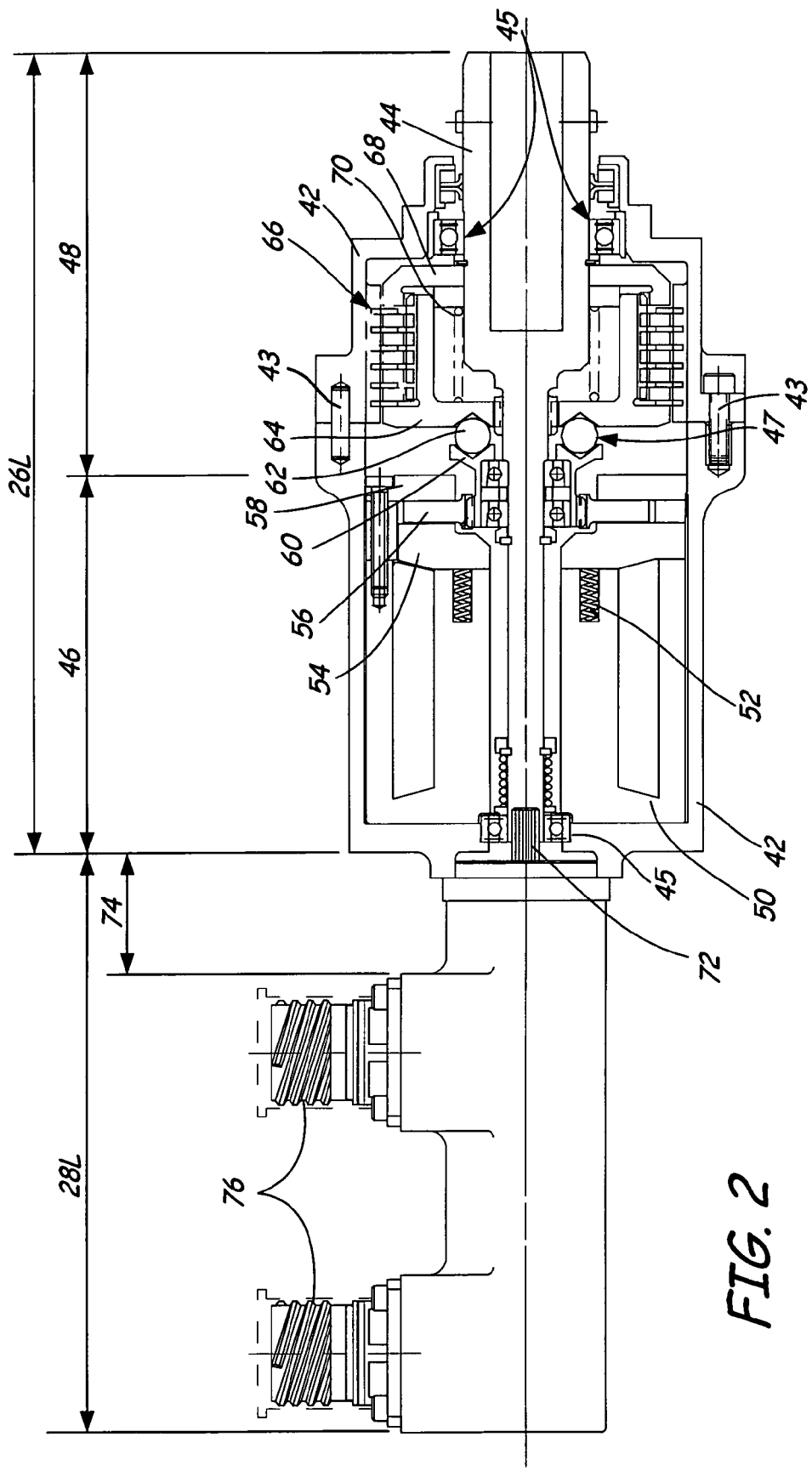
FIG. 2 is a sectional of view of an asymmetry brake and resolver from the system of FIG. 1.

FIG. 2 is a view of the asymmetry brake 26L and a view of the resolver 28L, with the asymmetry brake 26L shown in section. The asymmetry brake 26R and resolver 28R on the right wing 12R of the aircraft 10 would be arranged in generally mirror image, but would be otherwise similarly constructed (FIG. 1). The asymmetry brake 26L includes a housing 42, an input shaft 44, a pilot brake section 46, a ball ramp assembly 47, and a primary brake section 48. The pilot brake section 46 includes a solenoid 50, bias springs 52, a clapper plate 54, a friction plate 56, and a grounding plate 58. The ball ramp assembly 47 includes an output ball ramp 60, balls 62, and an input ball ramp 64. The primary brake section 48 includes a disk brake assembly 66, a limiting plate 68, and return springs 70. The resolver 28L includes a spline 72, a gear reduction section 74, and resolver electrical connectors 76.

When the asymmetry brake 26L is in a released position, the drive line torque shafting 20L rotates the input shaft 44. In the released position, both the primary brake section 48 and the pilot brake section 46 are disengaged (i.e. the solenoid 50 is electrically activated) such that primary brake section 48 rotates along with the input shaft 44. During, for example, a normal pre-flight brake inspection condition or an in-flight asymmetry condition, the pilot brake section 46 is engaged (i.e. the solenoid 50 is electrically deactivated) as the result of a control signal from the PDU 18 (FIG. 1). The engagement of the pilot brake section 46 does not exert a braking torque on the input shaft 44, rather the engagement of the pilot brake section 46 separates the ball ramp assembly 47 which forces the primary brake section 48 (which is splined to the input shaft 44) into engagement with the housing 42. The engagement of the primary brake with the housing 42 exerts a braking torque on the input shaft 44 and the drive line torque shafting 20L. This braking torque holds the flaps 14L in a fixed position (FIG. 1) which can be measured by the resolver 28L. If an in-flight asymmetry has occurred, the flaps 14R can then be fixed to prevent serious flight control problems for the aircraft 10 (FIG. 1).

The housing 42 operatively receives the input shaft 44 which is rotatable about an axis of rotation. The housing 42 surrounds and is engaged selectively by portions of the pilot brake section 46 and the primary brake section 48. The ball ramp assembly 47 is disposed between the pilot brake section 46 and the primary brake section 48 within the housing 42 to transfer a triggering torque from the pilot brake section 46 to the primary brake section 48, which in turn exerts a braking torque on the input shaft 44. The disposition of the ball ramp assembly 47 between the pilot brake section 46 and the primary brake section 48 allows the ball ramp assembly 47 to automatically return to an operative non-torque transferring (i.e., non-separated) condition when the pilot brake section 46 is energized (the pilot brake section 46 is in a released position) whether the input shaft 44 is holding a load from the drive line torque shafting 20L or not. The automatic return of the ball ramp assembly 47 allows a return bias force exerted in the primary brake section 48 to release the input shaft 44 and stop the application of the braking torque. The automatic return of the ball ramp assembly 47 to an operative non-torque transferring (non-separated) condition in response to the energization of the pilot brake section 46 allows the asymmetry brake 26L to release the input shaft 44 during routine system checks prior to flight and during flight itself even if the input shaft 44 is holding a load as a result of the other components of the flight control actuation system 16 or an air load over the flaps 14L (FIG. 1).

The asymmetry brake 26L described herein uses the pilot brake section 46 to leverage and multiply the triggering torque the pilot brake exerts through the ball ramp assembly 47 which acts as a gain mechanism on a primary brake assembly 66 to produce higher brake torques on the input shaft 44. The asymmetry brake 26L can react a full PDU motor stall torque in a small wing 12L envelope. By using a pilot brake section 46 to trigger a primary brake section 48, the solenoid 50 of the pilot brake section 46 can be made smaller resulting in both a reduced asymmetry brake 26L impact on wing 12L envelope and reduced solenoid 50 power requirements.

More particularly, the housing 42 surrounds the internal components of the asymmetry brake 26L including the input shaft 44. The housing 42 can be divided into sections connected together by bolts and/or pins 43. The sectional arrangement of the housing 42 aids in assembly, service, repair and replacement of the components of the asymmetry brake 26L. The input shaft 44 operatively inserts within the housing 42 to couple with the resolver 28L while an exterior portion couples to the drive line torque shafting 20L (FIG. 1). More particularly, the input shaft 44 is supported within the housing 42 on bearings 45 which are disposed between the housing 42 and the input shaft 44. The bearings 45 allow the input shaft 44 to rotate about an axis of rotation.

The pilot brake section 46 is disposed between the resolver 28L and the primary brake section 48. The primary brake section 48 is disposed adjacent the portion of the input shaft 44 that couples to the drive line torque shafting 20L (FIG. 1).

In the pilot brake section 46, the solenoid 50 houses the bias springs 52. The solenoid 50 interfaces with the clapper plate 54 which is axially movable along the input shaft 44. The axial movement of the clapper plate 54 selectively engages the plate 54 with the friction plate 56 when triggering torque is required. The friction plate 56 extends radially inward to connect with the output ball ramp 60 of the ball ramp assembly 47. The friction plate 56 interfaces with the grounding plate 58 which is secured to the solenoid 50. The friction plate 56 selectively engages the grounding plate 58 when sufficiently engaged by the clapper plate 54. Thus, the clapper plate 54 and the grounding plate 58 are disposed axially along the input shaft 44 to either side of the friction plate 56 such that each plate 54 and 58 has a surface which can be engaged by the friction plate 56 to generate the triggering torque.

In addition to connecting with the friction plate 56, the output ball ramp 60 of the ball ramp assembly 47 connects with the input shaft 44 via bearings and extends axially along the input shaft 44 to engage the balls 62. The balls 62 are received between generally radially and tangentially extending angled surfaces of the output ball ramp 60 and input ball ramp 64.

The input ball ramp 64 movably connects with the input shaft 44 via a spline and extends axially along the shaft away from the balls 62. The input ball ramp 64 extends generally radially outward around the input shaft 44 from its connection region therewith to connect with the disk brake assembly 66 adjacent the housing 42. The disk brake assembly 66 interfaces with portions of the housing 42 and selectively engages the portions of the housing 42 when braking torque is required from the primary brake section 48. The limiting plate 68 is affixed to the input shaft 44 and extends radially to interface with the disk brake assembly 66. The return spring 70 engages a portion of the input ball ramp 64 and a portion of the limiting plate 68. The return spring 70 extends generally axially along the input shaft 44 radially inward of the disk brake assembly 66. The return spring 70 provides a return bias force on the input ball ramp 64 which in response releases the brake assembly 66 by separating the disks.

The resolver 28L is disposed adjacent the pilot brake section 46 of the asymmetry brake 26L. The resolver 28L includes a spline 72 or other means of coupling with the input shaft 44. The gear reduction section 74 of the resolver 28L generally includes a simple spur gear or planetary gears. The gear reduction section 74 reduces the revolutions transferred from the input shaft 44 to less than one revolution at the position sensor shafts 76. Sensors (not shown) located adjacent the resolver electrical connectors 76 measure the rotation of the shaft (not shown) within the resolver 28L and signal to the control unit 36 on lines 30L and 32L to indicate the positions of the drive line torque shafting 20L and flap panels 14L (FIG. 1).

Figure 3:
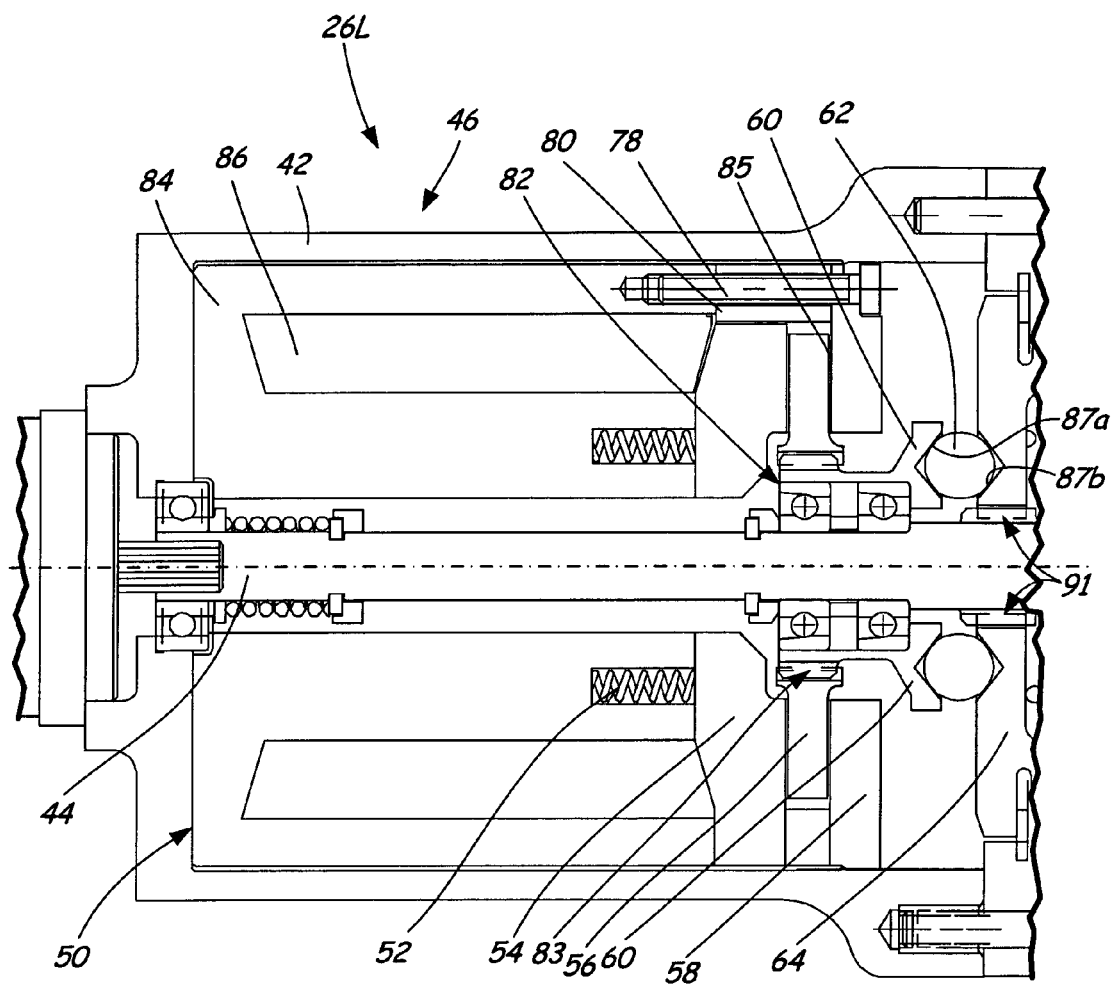
FIG. 3 is a sectional view of a pilot brake section and a partial sectional view of a ball ramp section of the asymmetry brake of FIG. 2.

FIG. 3 is a sectional view of a pilot brake section 46 of the asymmetry brake 26L. In addition to the solenoid 50, bias springs 52, clapper plate 54, friction plate 56, and grounding plate 58, the pilot brake section 46 includes bolts 78, sleeves 80 and bearings 82. The solenoid 50 includes a core 84 and a coil 86. The output ball ramp 60 includes an angle surface 87a. The input ball ramp 64 includes an angled surface 87b.

In FIG. 3, the static ferritic core 84 is positioned radially around the input shaft 44. The core 84 receives the electrical coil 86 in a cavity therein. The grounding plate 58 is secured through the sleeves 80 by the bolts 78 disposed adjacent the housing 42. Thus, the grounding plate 58, bolts 78 and sleeves 80 remain static along with the core 84 during operation of the asymmetry brake 26L.

When the solenoid 50 is selectively de-energized (e.g., when a braking torque must be exerted on the drive line torque shafting 20L through the input shaft 44 to correct an asymmetry condition) the bias springs 52 exert a bias force on the clapper plate 54 which moves the plate 54 away from the core 84 into engagement with the friction plate 56. The engagement of the friction plate 56 by the clapper plate 54 moves the friction plate 56 generally axially into engagement with the grounding plate 58. Thus, by de-energizing the coil 86 the triggering torque is exerted on two surfaces of the friction plate 56, by the clapper plate 54 and the grounding plate 58. The triggering torque is transferred through the friction plate 56 to the output ball ramp 60. The triggering torque holds the output ball ramp 60 stationary as the input shaft 44 continues to rotate. As discussed below, the triggering torque is then transferred through the ball ramp assembly 47 to the primary brake section 48. More particularly, the triggering torque causes the balls 62 to rotate up the angled surfaces 87a and 87b to separate the ball ramps 60 and 64. Thus, the triggering torque moves the balls 62 out of an operative arrangement between the angled surfaces 87a and 87b of the ball ramp assembly 47.

When the electrical coil 86 is selectively energized, the clapper plate 54 is attracted toward the core 84. This attraction overcomes the repelling bias exerted on the clapper plate 54 by the springs 52. The clapper plate 54 is restrained from rotational movement by an arrangement of C-shaped grooves on its perimeter. The grooves correspond to the matching outer diameter of the sleeves 80. Gaps 85 open between the clapper plate 54, friction plate 56, and grounding plate 58, and the friction plate 56 does not engage either the clapper plate 54 or the grounding plate 58. Thus, when the electrical coil 86 is energized no braking torque is exerted on the input shaft 44 and no triggering torque is exerted on the ball ramp assembly 47. Energizing the electrical coil 86 to disengage the clapper plate 54 from the friction plate 56 eliminates a reaction torque on the output ball ramp 60 (which is connected by splines 83 to the friction plate 56). This generates a tangential force on the balls 62, causing them to roll down angled surfaces 87a and 87b and return to the operative arrangement between the angled surfaces 87a and 87b of the ball ramp assembly 47.

Figure 4:
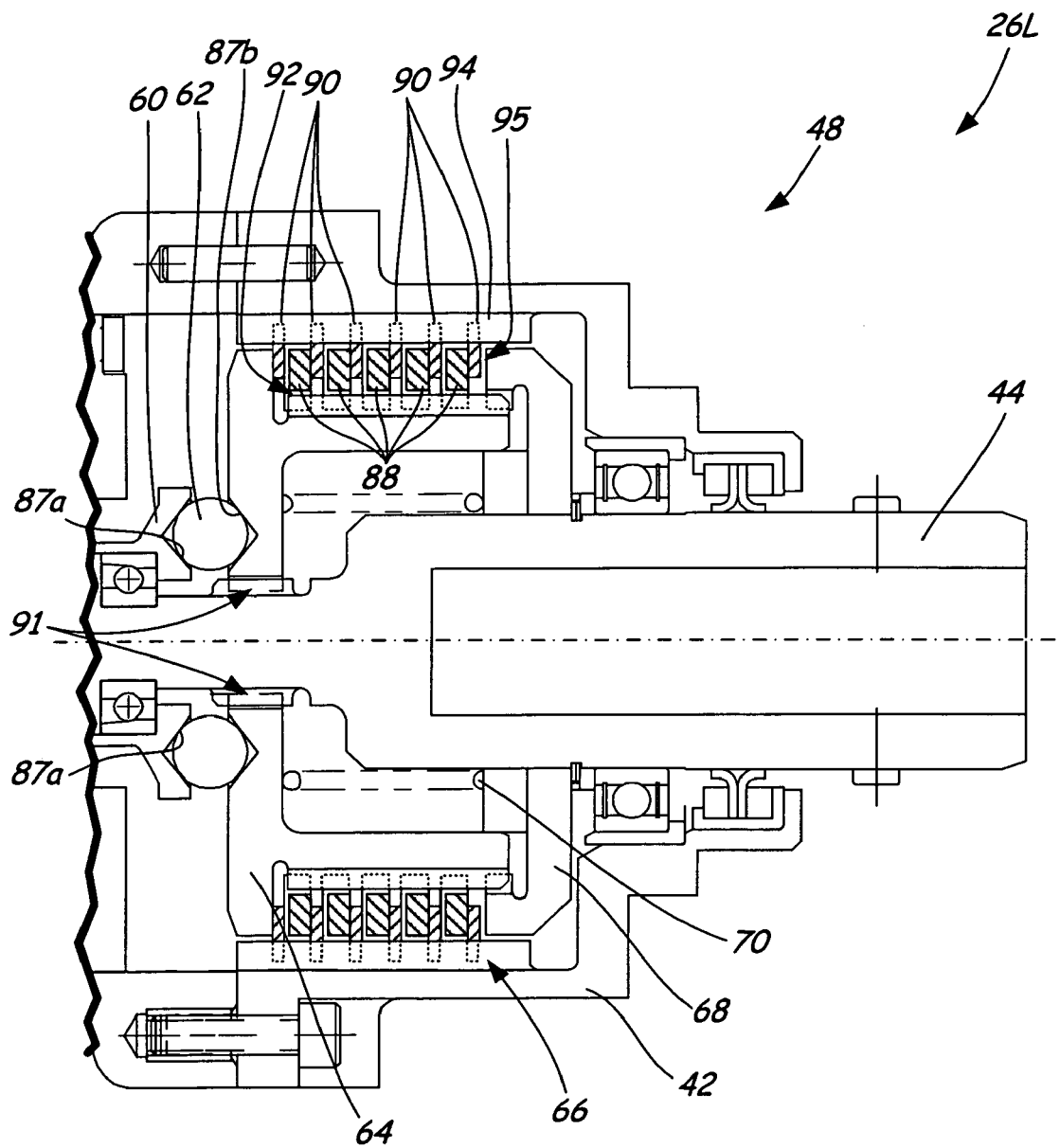
FIG. 4 is a sectional view of a primary brake section and a partial sectional view of the ball ramp section of the asymmetry brake of FIG. 2.

FIG. 4 is sectional view of a primary brake section 48 of the asymmetry brake 26L. The disk brake assembly 66 includes rotating friction plates 88 and stationary plates 90. The rotating plates 88 include splines 92. The stationary plates 90 include splines 94. Although no clearance is illustrated in FIG. 4 other than gap 95, when the primary brake section 48 is in a released position (allowing the shaft 44 to rotate), clearances develop between the rotating plates 88 and the stationary plates 90 allowing the rotating plates 88 to rotate relative to the stationary plates 90.

In FIG. 4, the input ball ramp 64 extends outward around the input shaft 44 from a spline 91 connection therewith to connect with the disk brake assembly 66 adjacent the housing 42. The disk brake assembly 66 includes the rotating friction plates 88. Each of the rotating plates 88 has a spline 92 which connects the rotating plates 88 to the input ball ramp 64. The rotating plates 88 interface with the stationary plates 90 which are connected by splines 94 to the housing 42 or some other grounded feature of the brake 26L.

When triggered by the torque exerted from the pilot brake section 46, (and transferred to the primary brake section 48 by the ball ramp assembly 47) gaps (such as the single gap 95 illustrated) between the plurality of rotating plates 88 and plurality of stationary plates 90 are reduced until the rotating plates 88 engage the stationary plates 90. More particularly, the input ball ramp 64 moves away from the pilot section 46 in response to the triggering torque exerted from the pilot brake section 46, this torque overcomes the bias force the return springs 70 exert through the input ball ramp 64. The movement of the output ball ramp 64 in response to the braking torque moves the rotating plates 88 into engagement with the stationary plates 90.

When the electrical coil 86 is energized the output ball ramp 60 rotates away from the input ball ramp 64 in response to the balls 62, which are subjected to a tangential force. The balls 62 return to an operative arrangement seating them in the bottom of the ball ramps 60 and 64 between the angled surfaces 87a and 87b. More particularly, once the pilot brake section 46 is released, there is no longer any torque to react the tangential force on the balls 62 and they begin to rotate with the output ball ramp 60. This rotation allows the balls 62 to roll down the ball ramps 60 and 64. As the balls 62 roll down the ball ramps 60 and 64, the input ball ramp 64 moves generally toward the output ball ramp 60 in response to the bias of the return springs 70 to return the ball ramp assembly 47 to an operative arrangement seating the balls 62 in the bottom of the ball ramps 60 and 64 between the angled surfaces 87a and 87b. The movement of the input ball ramp 64 disengages the rotating plates 88 from the stationary plates 90 and the gaps 95 are restored therebetween. In this manner, the primary brake section 48 is released from the input shaft 44.

Figure 5A:
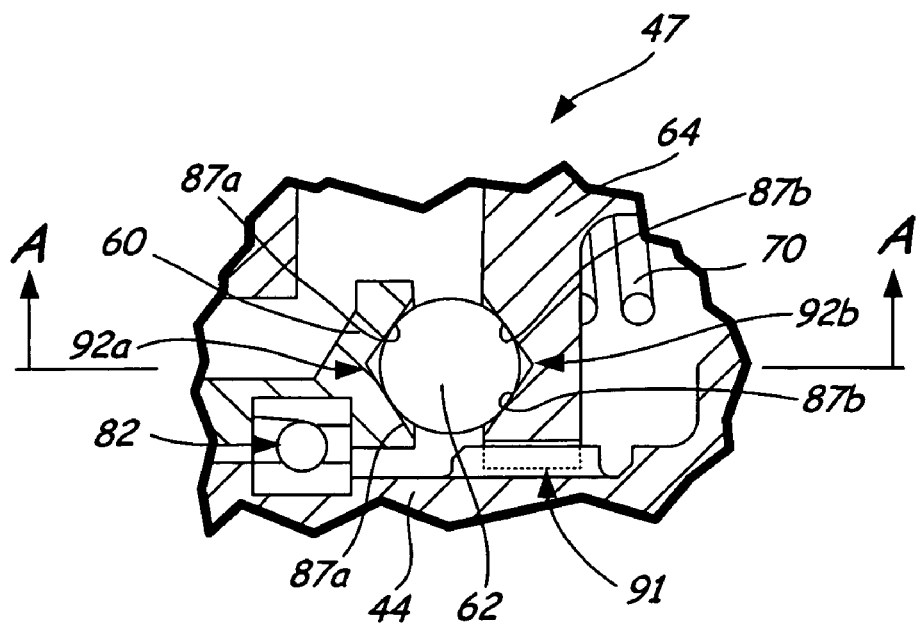
FIG. 5A is a sectional view of the ball ramp assembly of the asymmetry brake with the primary brake in a non-engagement position.
Figure 5B:
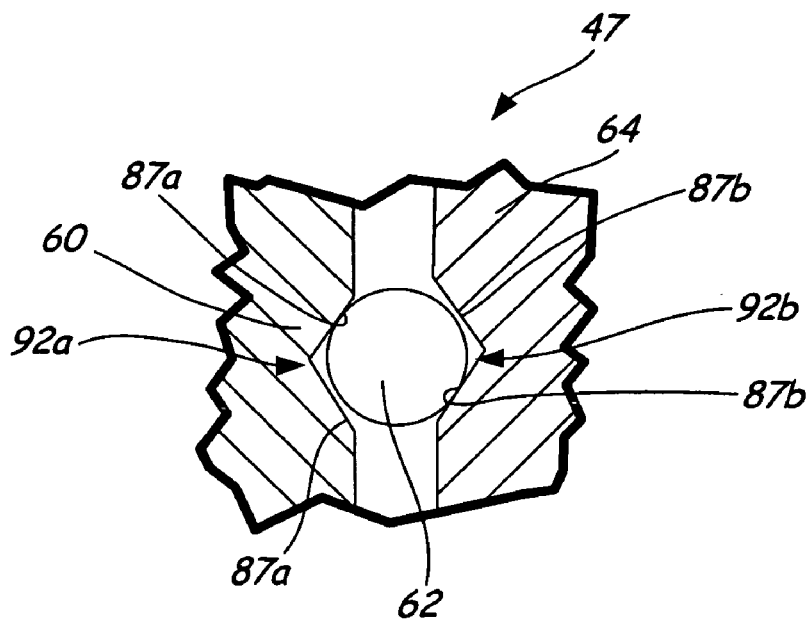
FIG. 5B is a sectional view of the ball ramp assembly along line A-A in FIG. 5A with the primary brake in an engagement position.

FIG. 5A and FIG. 5B are sectional views of the ball ramp assembly 47 with the primary brake section 48 in a released and engaged position with the input shaft 44. In addition to the angled surfaces 87a and 87b, the ball ramp assembly 47 includes bottoms or troughs 92a and 92b.

In FIG. 5A, when neither the primary brake section 48 nor the pilot brake section 46 is engaged, the angled surfaces 87a and 87b of the input and output ball ramps 64 and 60 retain the balls 62 therebetween. Together the angled surfaces 87a and 87b form grooves which receive the balls 62. The balls generally contact the angled surfaces 87a and 87b in their troughs 92a and 92b. When in the troughs 92a and 92b, the balls 62 are free to rotate along with the input ball ramp 64 and output ball ramp 60.

In FIG. 5B, (taken along line A-A in FIG. 5A) when the primary brake section 48 and the pilot brake section 46 are engaged, the balls 62 have rotated up the angled surfaces 87a and 87b away from the troughs 92a and 92b to separate the ball ramps 60 and 64. More specifically, the balls 62 have forced the input ball ramp 64 to move generally away from the output ball ramp 60 which is stationary. This movement engages the rotating plates 88 with the stationary plates 90 (FIG. 4). The balls 62 are held in this position while the pilot brake section 46 is engaged to hold the output ball ramp 60 stationary, and the return spring 70 exerts a bias force on the input ball ramp 64 (FIG. 4). Once the pilot brake section 46 is released, there is no longer any torque to react a tangential force on the balls 62 and they begin to rotate with the output ball ramp 60. This rotation allows the balls 62 to roll down the angled surfaces 87a and 87b. As the balls 62 roll down the angled surfaces 87a and 87b, the input ball ramp 64 moves generally toward the output ball ramp 60 in response to the bias of the return springs 70 to return the ball ramp assembly 47 to an operative arrangement seating the balls 62 in the troughs 92a and 92b between the angled surfaces 87a and 87b (FIG. 2).

Although the present invention has been described with reference to preferred embodiments, workers skilled in the art will recognize that changes may be made in form and detail without departing from the spirit and scope of the invention.

The invention claimed is:

1. An asymmetry brake apparatus comprising:
   a housing;
   a shaft rotatable relative to the housing about an axis of rotation;
   a pilot brake configured to selectively engage the housing to generate a triggering torque;
   a primary brake movably connected with the shaft and configured to engage the housing to generate a braking torque on the shaft; and
   a ball ramp assembly operatively connected to and disposed between the pilot brake and the primary brake, wherein the ball ramp assembly has a first ball ramp connected to the pilot brake and a second ball ramp movably connected to the primary brake and balls disposed between the first and second ball ramps, wherein the balls separate the first and second ball ramps in response to the triggering torque from the pilot brake and the second ball ramp actuates engagement of the primary brake with the housing to generate the braking torque on the shaft.

2. The brake apparatus of claim 1, wherein the disposition of the ball ramp assembly between the pilot brake and the primary brake allows the ball ramp assembly to return to an operative non-separated condition when the pilot brake is disengaged from the housing whether or not the shaft is holding a load.

3. The brake apparatus of claim 2, wherein the return of the ball ramp assembly to the operative non-separated condition allows the primary brake to release the shaft.

4. The apparatus of claim 1, wherein the primary brake and the housing have corresponding friction plates which are selectively engaged to generate the braking torque when the ball ramp assembly transfers the triggering torque from the pilot brake to the primary brake.

5. The brake apparatus of claim 4, further comprising a return spring which exerts a bias force on the primary brake causing the primary brake to move generally axially with respect to the shaft to disengage the friction plates and release the shaft to rotate.

6. The brake apparatus of claim 1, wherein two surfaces of the pilot brake are engaged to generate the triggering torque.

7. The brake apparatus of claim 1, wherein the pilot brake comprises:
   a solenoid connected to the housing and adapted to be selectively electrically activated and deactivated;
   bias springs received within the solenoid;
   a clapper plate capable of generally axial motion with respect to the shaft to selectively engage the solenoid when the solenoid is electrically activated; and
   a friction plate connected to the ball ramp assembly;
   wherein when the solenoid is electrically deactivated the bias spring forces the clapper plate to move out of engagement with the solenoid and into engagement with the friction plate thereby generating the triggering torque.

8. The brake apparatus of claim 7, further comprising a grounding plate connected to the solenoid, wherein the engagement of the clapper plate with the friction plate moves the friction plate into engagement with the grounding plate such that the triggering torque is simultaneously generated by contact between the friction plate and the clapper plate and by contact between the friction plate and the grounding plate.

9. An asymmetry brake apparatus comprising:
   a housing having a first plurality of friction plates therein;
   a shaft rotatable relative to the housing about an axis of rotation;
   an electrical pilot brake adapted to engage a dynamic portion of the brake with a stator portion of the brake to generate a triggering torque when the electrical pilot brake is selectively electrically deactivated;
   a primary brake movably connected with the shaft and configured to selectively engage a second plurality of friction plates with the first plurality of friction plates to generate a braking torque on the shaft; and a ball ramp assembly operatively connected to and disposed between the pilot brake and the primary brake, wherein the ball ramp assembly has a first ball ramp connected to the pilot brake and a second ball ramp movably connected to the primary brake and balls disposed between the first and second ramps, wherein the balls separate the first and second ball ramps in response to the triggering torque from the pilot brake and the second ball ramp actuates engagement of the second plurality of friction plates with the first plurality of friction plates to generate the braking torque on the shaft.

10. The brake apparatus of claim 9, wherein the disposition of the ball ramp assembly between the pilot brake and the primary brake allows the ball ramp assembly to return to an operative non-separated condition when the pilot brake is disengaged whether or not the shaft is holding a load.

11. The brake apparatus of claim 10, wherein selective electrical activation of the pilot brake returns the ball ramp assembly to the operative non-separated condition and allows the primary brake to release the shaft.

12. The brake apparatus of claim 11, further comprising a return spring which exerts a bias force on the primary brake causing the primary brake to disengage the second plurality of friction plates from the first plurality of friction plates and release the shaft.

13. An asymmetry brake apparatus comprising:
a housing;
a shaft rotatable relative to the housing about an axis of rotation;
a solenoid connected to the housing and adapted to be selectively electrically activated and deactivated;
bias springs received within the solenoid;
a clapper plate capable of generally axial motion with respect to the shaft to selectively engage the stator solenoid when the solenoid is electrically activated;
a friction plate connected to a ball ramp assembly; and
a primary brake movably connected with the shaft and configured to engage the housing to generate a braking torque on the shaft;
wherein the ball ramp assembly is operatively connected between the asymmetry brake and the primary brake to receive a triggering torque from the asymmetry brake and transfer the triggering torque to the primary brake, wherein the ball ramp assembly has a first ball ramp connected to the friction plate and a second ball ramp movably connected to the primary brake and balls disposed between the first and second ramps, wherein the balls separate the first and second ball ramps in response to the triggering torque and the second ball ramp actuates engagement of the primary brake with the housing to generate the braking torque on the shaft, and wherein when the solenoid is electrically deactivated the bias spring forces the clapper plate to move out of engagement with the solenoid and into engagement with the friction plate thereby generating the triggering torque.

14. The brake apparatus of claim 13, wherein the ball ramp assembly has a first ball ramp operatively connected to the pilot brake and a second ball ramp operatively connected to the primary brake and balls disposed between the first and second ramps, wherein the balls separate the first and second ball ramps in response to the triggering torque and the second ball ramp actuates engagement of the primary brake with the housing to generate the braking torque on the shaft.

15. The brake apparatus of claim 14, wherein the primary brake has rotary friction plates which are configured to selectively engage stator friction plates secured to the housing.

* * * * *